United States Patent [19]

Crotty, III

[11] Patent Number: 5,580,118

[45] Date of Patent: Dec. 3, 1996

[54] SUN VISOR HAVING AN ALIGNMENT ELEMENT

[76] Inventor: Willard E. Crotty, III, 89 Miller Dr., Quincy, Mich. 49082

[21] Appl. No.: 515,036

[22] Filed: Aug. 14, 1995

[51] Int. Cl.⁶ .................................................. B60J 3/02
[52] U.S. Cl. ......................................... 296/97.12; 296/97.1
[58] Field of Search ................................ 296/97.1, 97.5, 296/97.8, 97.9, 97.11, 97.12, 97.13

[56] References Cited

U.S. PATENT DOCUMENTS

| | | |
|---|---|---|
| 2,667,222 | 1/1954 | McCarthy . |
| 3,343,867 | 9/1967 | Couch . |
| 4,075,468 | 2/1978 | Marcus . |
| 4,203,149 | 5/1980 | Viertel . |
| 4,353,592 | 10/1982 | Cziptschirsch . |
| 4,364,597 | 12/1982 | Viertel . |
| 4,378,129 | 3/1983 | Kaiser . |
| 4,411,467 | 10/1983 | Cziptschirsch . |
| 4,458,938 | 7/1984 | Viertel et al. ........................... 296/97.1 |
| 4,494,789 | 1/1985 | Flowerday . |
| 4,635,994 | 1/1987 | Dietz . |
| 4,696,510 | 9/1987 | Zwirner . |
| 4,810,023 | 3/1989 | Kawada ................................. 296/97.8 |
| 4,952,008 | 8/1990 | Lobanoff . |
| 4,998,765 | 3/1991 | Van Order et al. .............. 296/97.12 X |
| 5,011,212 | 4/1991 | Viertel . |
| 5,031,953 | 7/1991 | Miller . |
| 5,042,867 | 8/1991 | Crotty . |
| 5,054,839 | 10/1991 | White et al. ...................... 296/97.12 X |
| 5,131,711 | 7/1992 | Laferle .................................... 296/97.1 |
| 5,205,604 | 4/1993 | Smith . |
| 5,205,635 | 4/1993 | Van Order . |
| 5,205,639 | 4/1993 | White . |
| 5,338,082 | 8/1994 | Miller ..................................... 296/97.1 |
| 5,365,416 | 11/1994 | Peterson . |
| 5,445,427 | 8/1995 | Vandagriff ......................... 296/97.12 X |

FOREIGN PATENT DOCUMENTS

| | | |
|---|---|---|
| 4123117 | 1/1993 | Germany . |
| 4208267 | 9/1993 | Germany . |
| 2115762 | 9/1983 | United Kingdom . |
| 2154192 | 9/1985 | United Kingdom . |

*Primary Examiner*—Joseph D. Pape
*Attorney, Agent, or Firm*—Baker & Daniels

[57] ABSTRACT

A sun visor assembly including a core member and an outer covering assembly which folds over the core member and fastens to itself to secure the core member therein. The core member includes one or more first aligning elements, such as pegs outwardly projecting from the surfaces of the core member, and the outer covering assembly includes one or more complementary second aligning elements, such as holes in the rigid foundation of the cover which is externally covered by an upholstery material. When the outer covering assembly is folded over the core member during visor assembly, the first and second aligning elements mate to secure the core member substantially within the outer covering assembly.

17 Claims, 2 Drawing Sheets

SUN VISOR HAVING AN ALIGNMENT ELEMENT

BACKGROUND OF THE INVENTION

The present invention relates generally to sun visors for vehicles, and, in particular, to a sun visor having a core member and a covering assembly folded over the core member and fastened to itself to secure the core member within the covering assembly.

It is well known to provide a sun visor for the windshield of a vehicle, wherein the sun visor is mounted on the vehicle body roof for movement between a storage position adjacent the vehicle headliner, a first use position adjacent the windshield, and a second use position adjacent a side door window opening. A conventional sun visor comprises a solid inner core board of a pressed wood material and an outer cloth covering of a foam-backed cloth adhered to or otherwise connected to a kraft paper foundation. The covering is folded over the core board and is edge sewn along a seam circumjacent the periphery of the core board. More recently, there has been developed a sun visor having a molded plastic inner core. In U.S. Pat. No. 5,365,416, there is disclosed a sun visor having a plastic inner core and an outer covering assembly folded over the plastic core in the manner previously described. It is desired to improve the visor disclosed in this patent and to improve the assembly of sun visors.

SUMMARY OF THE INVENTION

The present invention provides a sun visor having a core member and an outer covering assembly covering the core member, wherein the core member includes a first aligning and retaining element and the outer covering assembly includes a second aligning and retaining element that mates with the first element upon folding the covering assembly over the core member, thereby properly aligning and holding the core member in place prior to final assembly of the visor.

In one embodiment, the sun visor comprises a core member having a plurality of pegs extending outwardly from a first surface thereof. The outer covering assembly includes a rigid foundation having holes therein, wherein the pegs snap into the holes upon folding the cover over the core member to hold the core in proper alignment with the cover. In another embodiment, the pegs extend from each of the two opposing faces of the core, and the cover includes corresponding holes. In yet another embodiment of the present invention, the pegs extend from the top edge of the core, and the cover includes corresponding holes to mate with these pegs. In still another embodiment of the present invention, one or more surfaces of the core contains holes therein and the cover includes pegs that snap into the holes in the core upon folding the cover over the core.

The core may be made of a fiberboard material or a plastic material. The core may be of a conventional size as disclosed in U.S. Pat. No. 5,365,416. Alternatively, the core may constitute a plastic insert containing the hinge assembly and an optional retaining pin. These elongated inserts may be of any size, such as a width/height ratio of between 9 and 10.

In another embodiment of the present invention, the core member includes a plurality of T-shaped pegs, and the cover includes a plurality of corresponding grooves. As the cover is folded over the core, the T-shaped pegs snap into one end of their associated grooves and are forced along the groove until they lock in position.

BRIEF DESCRIPTION OF THE DRAWINGS

The advantages and objects of this invention, and the manner of attaining them, will become apparent and the invention itself will be better understood by reference to the following description of embodiments of the invention taken in conjunction with the accompanying drawings, wherein.

Figure 1:
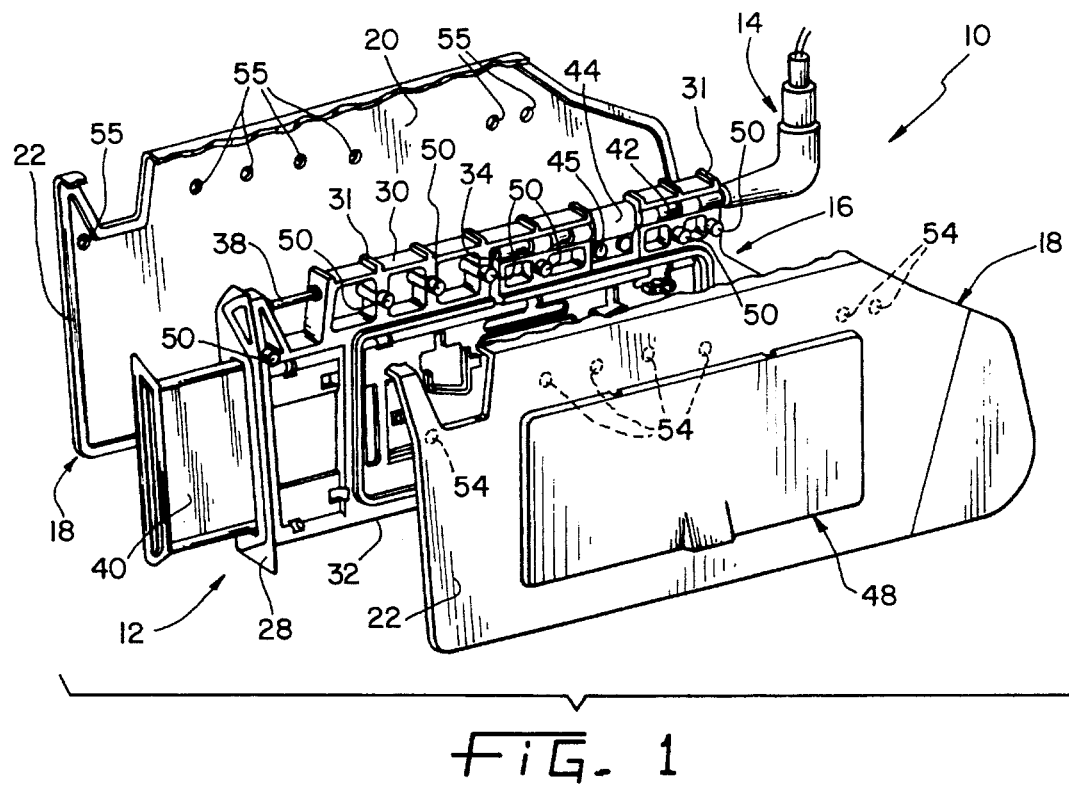
FIG. 1 is an exploded, front perspective view of one embodiment of a sun visor assembly configured according to the principles of the present invention.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

Figure 2:
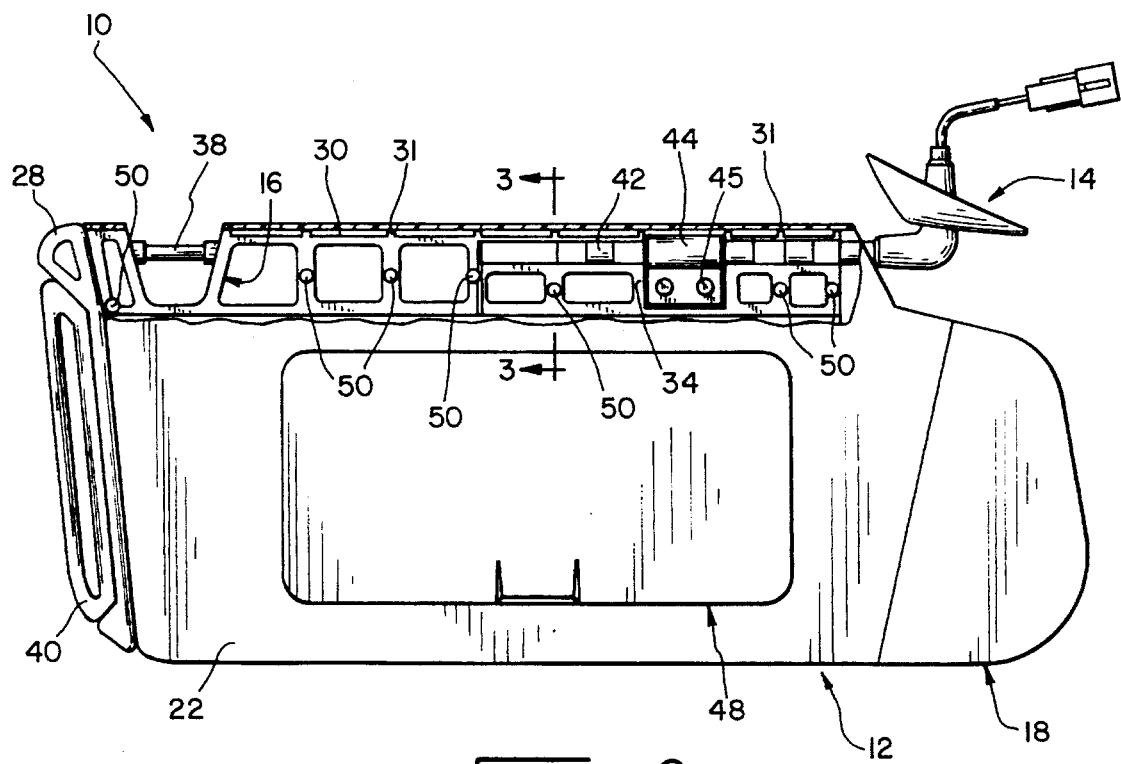
FIG. 2 is an assembled front elevational view of the sun visor assembly of FIG. 1 with a portion of the outer covering assembly removed to reveal the visor core member.

Referring now to FIGS. 1 and 2, there is shown a first embodiment of a sun visor assembly, generally designated 10, configured according to the present invention. Certain structural portions of sun visor assembly 10 which may be of any suitable type known in the art have been partially shown or described or omitted in the drawings and the text in the interest of clarity of illustration and explanation, and further because the construction of such portions are not essential to an understanding of the present invention.

Sun visor assembly 10 includes a sun visor body 12, shown in FIG. 1 in a disassembled or exploded arrangement, which is mounted to a vehicle headliner (not shown) by a mounting bracket and arm assembly 14. As is conventional, assembly 14 allows pivoting of the entire sun visor body 12 between alignments in juxtaposition with the front windshield and side window, as well as provides a horizontal axis about which sun visor body 12 rotates between a storage position and a window covering position.

Figure 3:
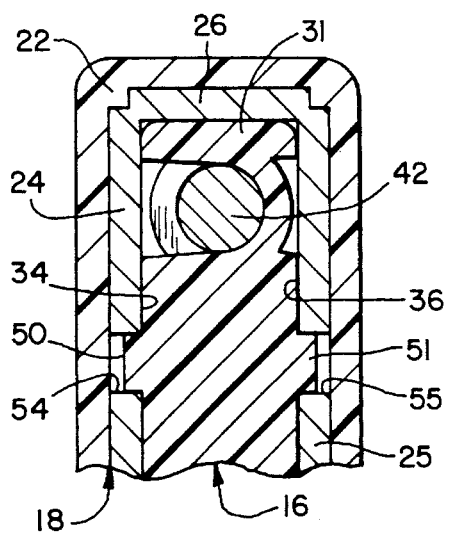
FIG. 3 is a fragmentary cross sectional view of the sun visor assembly taken along line 3—3 in FIG. 2, and with the outer covering assembly removed in FIG. 2 now shown.

Sun visor body 12 includes an inner core member 16 which is secured within outer covering assembly 18 during visor construction. Although in FIG. 1 outer covering assembly 18 is shown broken apart or as separate halves which sandwich inner core member 16 when assembled, assembly 18 is formed as a single unit and includes a rigid foundation 20 exteriorly covered by an upholstery material 22. Rigid foundation 20, which may be a kraft paper foundation or alternatively may be formed of other materials having suitable stiffness and weight characteristics, is preferably formed of a single piece of material. The single foundation piece is creased or scored to provide opposing flap sections 24, 25 and hinge section 26 as shown in FIG. 3. Suitable upholstery materials known in the art include fabric, vinyl, or cloth with a bonded foam backing. Upholstery material 22 is adhesively or otherwise connected to foundation 20 along the edges of rigid foundation 20 in a well known manner.

During visor construction, outer covering assembly 18 is folded over visor core member 16 and is attached to itself, for example by adhesives or by sewing, substantially along its perimeter to form a double layered peripheral edge. In this embodiment, the opposing flaps of outer covering assembly 18 are not attached at one end to accommodate an extender frame portion 28 of inner core member 16.

As best shown in FIG. 1, inner core member 16 is formed of molded plastic, preferably of ABS or polypropylene, and includes a top edge 30, a bottom edge 32, a front face 34, and a rear face 36 (See FIG. 3) opposite front face 34. Top edge 30 includes a series of spaced, transverse ridges 31 which are integrally formed therein and which serve as strengthening ribs. Inner core member 16 includes a pin member 38 exposed within an opening in outer covering assembly 18 and which may be removably snap fit into a retainer (not shown) mounted to the vehicle headliner. A separate visor extender blade 40, shown in a laterally extended position in FIG. 1, is slidably received within inner core member 16 and projects beyond core extender frame portion 28.

Proximate its top edge 30, inner core member 16 includes a hollow hinge portion in which rod 42 of the mounting bracket and arm assembly 14 slidably inserts. A generally U-shaped detent clamp 44 is secured to core member 16 with rivets 45 and receives rod 42 therethrough. Flats on rod 42 cooperate with detent clamp 44 to hold/lift sun visor body 12 in the park position.

In the embodiment of FIG. 1, sun visor assembly 10 includes a lighted vanity assembly, shown generally at 48, disposed on the front flap of outer covering assembly 18. The portion of inner core member 16 complementarily designed with lighted vanity assembly 48 to house the lighting circuity, and the electrical circuitry itself, are only partially shown herein as they form no part of the present invention, and further because they can be understood by referring to U.S. Pat. No. 5,365,416, which is incorporated herein by reference.

With additional reference to FIG. 3, which is a fragmentary cross-sectional view of the fully assembled sun visor assembly conceptually taken along line 3—3 in FIG. 2, one type of cooperating aligning elements will be further described. First aligning elements 50 are integrally molded into inner core member 16 at multiple locations along the width of core member 16. First aligning elements 50 are shaped as cylindrical pegs and project outwardly from front face 34. Outer covering assembly 18 includes complementary, second aligning elements 54 shown in dashed lines in FIG. 1 which are arranged to cooperate with core member aligning pegs 50. Second aligning elements 54 are formed as cylindrical holes or recesses provided in rigid foundation front flap section 24, and receiving holes 54 are sized in conjunction with pegs 50 such that pegs 50 will frictionally engage the surfaces defining holes 54 when inserted therein. Holes 54 are provided in a one-to-one correspondence with pegs 50 and selectively arranged on outer covering assembly 18 to properly align assembly 18 with inner core member 16.

Additionally molded into inner core member 16 are a second set of outwardly projecting, cylindrical pegs 51 on the core rear face 36. A set of cylindrical holes 55 in rigid foundation back flap section 25 cooperate with pegs 51. Although pegs 50, 51 are shown as equal in number, mirror imaged in position, and similarly shaped and dimensioned, it will be recognized that this is merely one suitable configuration of the aligning elements 50, 51. Different quantities, positioning, and shaping of the aligning elements 50, 51 may be performed within the scope of the invention. For example, although achieving the optimum folded position of flap sections 24, 25 over core member 16 during assembly might be more time consuming as one of the flap sections would not be positively located relative to the core member via an aligning element, pegs or otherwise configured aligning elements could be placed on only one core member face or edge. In addition, the projecting aligning elements could be mounted to outer covering assembly 18 and fitted during assembly into recesses provided in inner core member 16.

During assembly of sun visor assembly 10, inner core member 16 is preferably aligned on the splayed open flaps of outer covering assembly 18 such that either pegs 50 or 51 insert into their respective aligning holes 54 or 55. As the flaps of outer covering assembly 18 are folded together in order to position them for securement together, and when the flaps have been moved to a final assembly arrangement, the other of pegs 50, 51 snap into engagement with their respective aligning holes to retain inner core member 16 within outer covering assembly 18. The outer covering assembly flaps or panels can then be secured together with the inner core member retained in a proper position.

Figure 4:
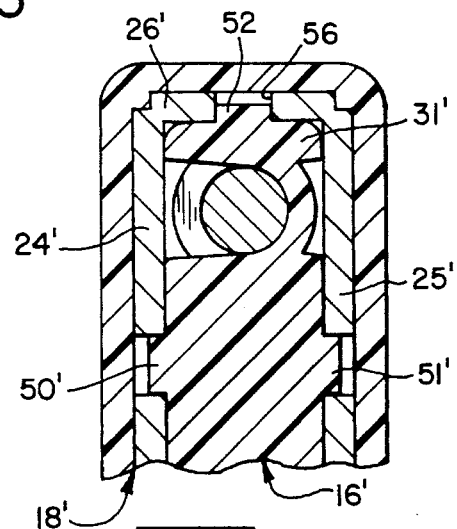
FIG. 4 is a fragmentary cross sectional view, conceptually similar to the view of FIG. 3, showing an alternate configuration of a visor core member with aligning elements of the present invention.

Referring now to FIG. 4, which is a view conceptually similar to the view of FIG. 3, there is shown an alternate embodiment of the present invention. Inner core member 16' is folded within outer covering assembly 18' and aligning pegs 50', 51' insert within holes in rigid foundation flap sections 24' and 25'. Additional cylindrical pegs, one of which is shown at 52, project upwardly from ridges 31' formed in the top edge and insert into aligning holes, one of which is shown at 56, provided in rigid foundation hinge section 26'. It will be appreciated that pegs 52 could be positioned along other sections of the core member top edge provided the pegs project outward past the apex of ridges 31' in order to engage the outer covering assembly.

Figure 5:
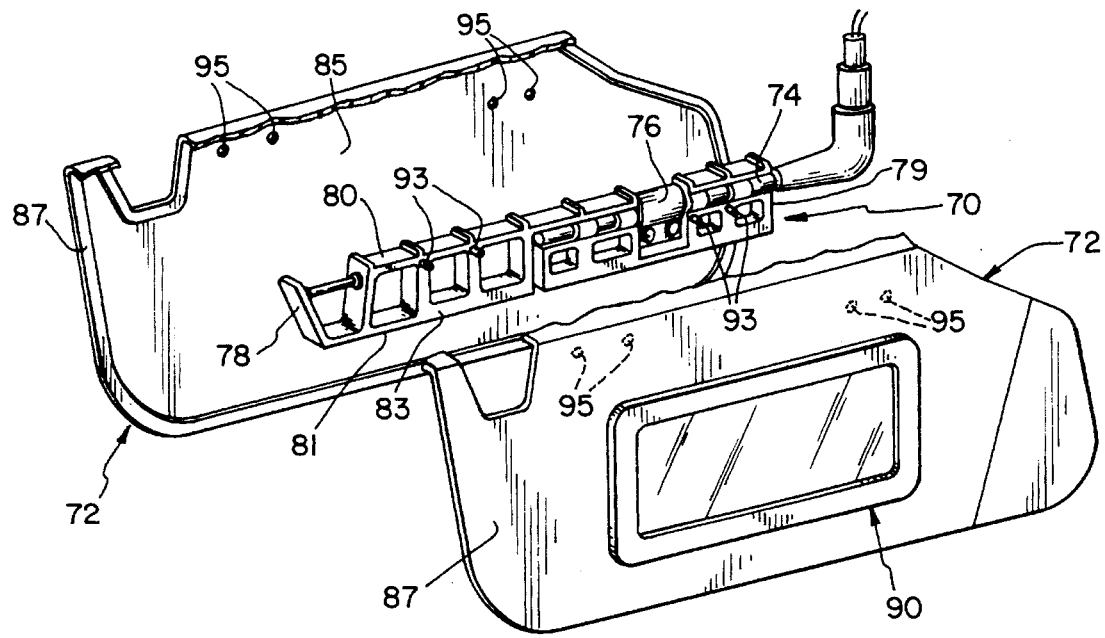
FIG. 5 is an exploded, front perspective view of an alternate embodiment of a sun visor assembly of the present invention.

Referring now to the exploded perspective view of FIG. 5, there is shown another alternate embodiment of a sun visor assembly of the present invention. The sun visor assembly includes a reduced height inner core member 70 and an outer covering assembly 72 shown in two parts. Rod 74 of the mounting bracket and arm assembly attachable to the headliner slidably inserts into a hinge hollow in inner core member 70 and cooperates with detent clamp 76 as described with respect to FIG. 1.

Inner core member 70, which may be molded from plastic or constructed from pressed wood or other suitable materials, includes side edges 78, 79, top edge 80, bottom edge 81, front face 83 and a rear face. The width of inner core member 70, i.e. the distance between side edges 78, 79, is about nine to ten times larger then the height of inner core member 70, i.e. the distance between top edge 80 and bottom edge 81. Other smaller and larger width to height ratios, for example within the range of three to fifteen, and preferably within the range of eight to eleven, may also be employed.

Outer covering assembly 72 is formed of a foldable, one-piece rigid foundation 85 covered with an adhesively connected upholstery material 87. An unlighted mirror assembly 90 is shown secured to a front flap of outer covering assembly 72 with suitable fasteners known in the art. Assembly 72 is folded around inner core member 70 and secured to itself as described above during assembly of the sun visor.

The aligning elements in this embodiment include four cylindrical pegs 93 outwardly projecting from each of front face 83 and the rear face of inner core member 70. For each core face, the four pegs 93 are arranged in pairs at different heights along inner core member 70. Correspondingly shaped holes 95 in rigid foundation 85 are arranged such that inner core member 70 is arranged in a proper assembly alignment when the eight pegs 93 insert into holes 95 during folding securement of the outer covering assembly 72 around inner core member 70.

Figure 6:
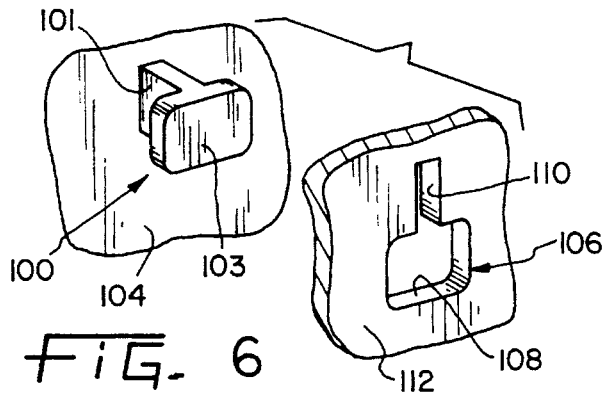
FIG. 6 is a diagrammatic perspective view of one embodiment of aligning elements disposed on the visor core member and the outer covering assembly and with the aligning elements in a disengaged arrangement.

Referring now to FIG. 6, an alternate configuration of a representative set of aligning elements which may be substituted for the sets of previously described cylindrical pegs and holes is illustrated in an exploded view and with the elements disengaged. The aligning elements include a T-shaped peg 100 and a complementary groove 106. T-shaped peg 100 includes an upstanding base 101 and a distal head 103. T-shaped peg 100 may be integrally formed with or attached to a surface shown at 104, and surface 104 is preferably a part of the inner core member but may alternatively be part of the rigid foundation. Groove 106 includes an insertion opening 108 sized to accommodate peg head 103 and a slot 110 sized to slidably receive peg base 101. Groove 106 is naturally provided in a portion 112 of a visor component complementary to the visor component that includes surface 104.

Figure 7:
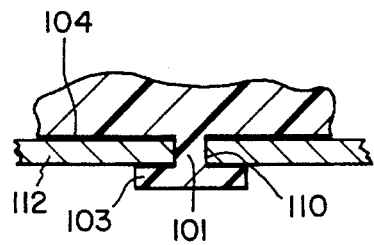
FIG. 7 is top, cross-sectional view of the aligning elements of FIG. 6 in an assembled or engaged arrangement.

To assemble a sun visor having pegs 100 disposed on the inner core member, the pegs 100 are snapped into insertion openings 108 of their cooperating grooves 106 on the outer cover assembly. During the folding process, each peg base 101 is slid within its mating groove slot 110. When the axial end of the slot is reached, aligning elements 100, 106 will be arranged as shown in the cross-sectional top view of FIG. 7. When so arranged, the inner core member and outer covering assembly are arranged in a proper alignment for visor assembly and are locked together so as not to become misaligned when the outer covering assembly flaps are fastened together or when the sun visor assembly is subsequently installed into a vehicle.

While this invention has been described as having multiple designs, it will be appreciated that the foregoing is presented by way of illustration only, and not by way of any limitation, and that the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sun visor assembly for mounting on a rod, comprising:

a core member having a first aligning element, said core member adapted to be non-slidably mounted on said rod; and a foldable outer covering assembly covering said core member, said covering assembly comprising an upholstery material overlaying a rigid foundation, said outer covering assembly comprising a second aligning element which mates with said first aligning element substantially within said outer covering assembly.

2. The sun visor of claim 1 wherein said first aligning element comprises a plurality of upstanding pegs and said second aligning element comprises a plurality of holes, wherein said pegs are snapped into frictional engagement with said holes as said outer covering assembly is folded over said core member to secure said core member substantially within said outer covering assembly.

3. The sun visor of claim 1 wherein said core member comprises an elongate plastic component having a width/height ratio of between 9 and 10.

4. The sun visor of claim 1 wherein said core member includes a first face, a second face, and an edge, and wherein said first aligning element is disposed on said first face.

5. The sun visor of claim 4 further comprising a third aligning element disposed on said second face and a fourth aligning element on said outer covering assembly which mates with said third aligning element.

6. The sun visor of claim 5 further comprising a fifth aligning element on said edge and a sixth aligning element on said outer covering assembly which mates with said fifth aligning element.

7. The sun visor of claim 4 further comprising a third aligning element disposed on said edge and a fourth aligning element on said outer covering assembly which mates with said third aligning element.

8. The sun visor of claim 1 wherein said core member is made of a plastic material.

9. The sun visor of claim 1 wherein said core member is made of a pressed wood material.

10. The sun visor of claim 1 wherein said core member is substantially the same length as said outer covering assembly.

11. The sun visor of claim 1 wherein said core member further comprises a pin member whereby said visor can be detachably secured to a retainer.

12. The sun visor of claim 1 wherein said core member further comprises a hinge portion in which said rod is mounted.

13. A sun visor assembly, comprising:

a core member having a first face, a second face, and an edge, and a first aligning element disposed on said edge of said core member; and a foldable outer covering assembly covering said core member, said covering assembly comprising an upholstery material overlaying a rigid foundation, said outer covering assembly comprising a second aligning element which mates with said first aligning element to secure said core member substantially within said outer covering assembly.

14. A sun visor assembly, comprising:

a core member having an upstanding T-shaped peg; and a foldable outer covering covering said core member, said covering assembly comprising an upholstery material overlaying a rigid foundation, said outer covering assembly comprising a slot in said foundation, said peg is slidably received within said slot to secure said core member substantially within said outer covering assembly.

15. A sun visor assembly comprising:

an inner core member having a width/height ratio of between 3 and 15; and an outer covering assembly covering said inner core member, said outer covering assembly comprising an upholstery material overlaying a rigid foundation;

said outer covering assembly folded over said core member and fastened to itself to secure said core member substantially within said covering assembly, said outer covering assembly having a larger width than said inner core member and substantially defining the shape of the sun visor assembly.

16. The sun visor assembly of claim 15 wherein said inner core member comprises a width/height ratio of between 9 and 10.

17. The sun visor of claim 16 wherein said core member is substantially the same length as said outer covering assembly.

* * * * *